US010959365B2

(12) United States Patent
Zemenchik

(10) Patent No.: US 10,959,365 B2
(45) Date of Patent: Mar. 30, 2021

(54) SYSTEM AND METHOD FOR CONTROLLING THE POSITION OF AN AGRICULTURAL IMPLEMENT BY APPLYING A BRAKING FORCE TO A WHEEL OF THE IMPLEMENT

(71) Applicant: CNH Industrial America LLC, New Holland, PA (US)

(72) Inventor: Robert A. Zemenchik, Kenosha, WI (US)

(73) Assignee: CNH Industrial America LLC, New Holland, PA (US)

(*) Notice: Subject to any disclaimer, the term of this patent is extended or adjusted under 35 U.S.C. 154(b) by 297 days.

(21) Appl. No.: 16/103,333

(22) Filed: Aug. 14, 2018

(65) Prior Publication Data

US 2020/0053948 A1 Feb. 20, 2020

(51) Int. Cl.
*A01B 69/00* (2006.01)
*H02K 49/06* (2006.01)
*A01B 76/00* (2006.01)
*A01B 63/14* (2006.01)
*B60T 8/17* (2006.01)

(52) U.S. Cl.
CPC ............ *A01B 69/004* (2013.01); *A01B 63/14* (2013.01); *A01B 76/00* (2013.01); *H02K 49/065* (2013.01); *B60T 8/1701* (2013.01)

(58) Field of Classification Search
CPC ....... A01B 69/00; A01B 69/004; A01B 63/14; A01B 76/00; A01B 15/20; H02K 49/065
See application file for complete search history.

(56) References Cited

U.S. PATENT DOCUMENTS

| 3,722,919 | A | * | 3/1973 | Herbert | B60T 1/00 |
| | | | | | 280/432 |
| 3,921,766 | A | * | 11/1975 | May | B60T 1/04 |
| | | | | | 188/167 |
| 4,232,910 | A | | 11/1980 | Snyder | |
| 5,505,267 | A | | 4/1996 | Orbach et al. | |

(Continued)

OTHER PUBLICATIONS

Magtrol, CHB Series Base Mounted Hysteresis Brakes: Product Brochure, 6 pages. https://www.magtrol.com/product/chb-series-base-mounted-hysteresis-brake/?psa=].

(Continued)

*Primary Examiner* — Jessica H Lutz
(74) *Attorney, Agent, or Firm* — Rebecca L. Henkel; Rickard K. DeMille

(57) ABSTRACT

In one aspect, a system for controlling the position of an agricultural implement being towed by an agricultural vehicle may include first and second wheels and first and second non-contact-based braking devices. As such, the first braking device may be configured to apply a braking force to the first wheel, and the second braking device may be configured to apply a braking force to the second wheel. Furthermore, the system may include a controller configured to control an operation of the first braking device or the second braking device when it is determined that the position of the implement differs from a predetermined position for the implement such that the braking force is applied to the corresponding wheel in a manner that adjusts the position of the implement towards the predetermined position.

14 Claims, 6 Drawing Sheets

(56) References Cited

U.S. PATENT DOCUMENTS

| | | | |
|---|---|---|---|
| 6,042,196 A | | 3/2000 | Nakamura et al. |
| 6,232,686 B1 * | | 5/2001 | Schneider ............ H02K 49/065 |
| | | | 188/267 |
| 6,668,225 B2 * | | 12/2003 | Oh ........................... B60T 7/20 |
| | | | 180/282 |
| 6,804,597 B1 | | 10/2004 | Posselius et al. |
| 7,225,891 B2 | | 6/2007 | Gehring et al. |
| 7,798,263 B2 | | 9/2010 | Tandy, Jr. et al. |
| 7,950,751 B2 | | 5/2011 | Offerle et al. |
| 8,190,364 B2 | | 5/2012 | Rekow |
| 8,260,518 B2 * | | 9/2012 | Englert ..................... B60D 1/58 |
| | | | 701/72 |
| 8,489,290 B1 * | | 7/2013 | Lange ..................... A01B 15/20 |
| | | | 701/50 |
| 9,037,346 B2 | | 5/2015 | Keys, II et al. |
| 9,114,832 B2 | | 8/2015 | Wang et al. |
| 9,538,696 B2 | | 1/2017 | Katupitiya et al. |
| 9,540,043 B2 | | 1/2017 | Lavoie |
| 9,709,969 B2 | | 7/2017 | Anderson et al. |
| 2009/0272551 A1 * | | 11/2009 | Thompson ........... A01B 69/003 |
| | | | 172/284 |
| 2017/0010619 A1 * | | 1/2017 | Foster ....................... B60T 7/00 |
| 2018/0325011 A1 * | | 11/2018 | Connell ................. A01C 7/201 |
| 2019/0001944 A1 * | | 1/2019 | Ying ................... B60T 8/17551 |

OTHER PUBLICATIONS

Magtol, CHB Series Base Mounted Hysteresis Brakes: Product Datasheet, 26 pages. https://www.magtrol.com/product/chb-series-base-mounted-hysteresis-brakes/?usa=].

* cited by examiner

SYSTEM AND METHOD FOR CONTROLLING THE POSITION OF AN AGRICULTURAL IMPLEMENT BY APPLYING A BRAKING FORCE TO A WHEEL OF THE IMPLEMENT

FIELD OF THE INVENTION

The present disclosure generally relates to agricultural implements and, more particularly, to systems and methods for controlling the position of an agricultural implement, such as relative to an associated agricultural vehicle, by applying a braking force to a wheel of the implement.

BACKGROUND OF THE INVENTION

Modern farming practices strive to increase yields of agricultural fields. In this respect, agricultural implements, such as planters, cultivators, pull-type sprayers, and/or the like, are configured to be towed across a field by a suitable agricultural vehicle, such as an agricultural tractor. While traversing the field, implements are configured to perform one or more operations on the field, such as planting seeds, cultivating the soil, and/or applying pesticides or other agricultural inputs.

To maximize the efficiency of the operation(s) being performed by an implement, it may be necessary that the implement and the associated agricultural vehicle follow a prescribed path across the field as closely as possible. As such, some agricultural vehicles include a guidance system configured to adjust the lateral position of the agricultural vehicle relative to the prescribed path such that the direction of travel of the vehicle is maintained within a suitable maximum lateral distance (e.g., two to four centimeters) from the prescribed path. However, in many instances, the implement is coupled to the agricultural vehicle by a vertical hitch pin that allows the implement to move laterally in a horizontal plane relative to the vehicle without restriction and in response to variable terrain. In this respect, as the implement is pulled through the field, its position may deviate from an acceptable range of lateral positions relative to the prescribed path even when the vehicle is positioned within the acceptable range of lateral positions. As such, subsequent use (e.g., during spraying operations) of the vehicle path using following planting operations may damage the emerged plants.

Accordingly, an improved system and method for controlling the position of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the position of an agricultural implement being towed by an agricultural vehicle. The system may include first and second wheels and first and second non-contact-based braking devices. As such, the first braking device may be configured to apply a braking force to the first wheel, and the second dependent braking device may be configured to apply a braking force to the second wheel. Furthermore, the system may include a controller configured to control an operation of the first braking device or the second braking device when it is determined that the position of the implement differs from a predetermined position for the implement such that the braking force is applied to the corresponding wheel in a manner that adjusts the position of the implement towards the predetermined position.

In another aspect, the present subject matter is directed to a method for controlling the position of an agricultural implement being towed by an agricultural vehicle. The method may include controlling, with a computing device, an operation of the implement as the implement is being towed across a field by the vehicle. The implement may include a first non-contact-based braking device configured to apply a braking force to a first wheel of the implement and a second non-contact-based braking device configured to apply a braking force to a second wheel of the implement. The method may also include determining, with the computing device, a position of the implement relative to a predetermined position. Furthermore, when the position of the implement differs from the predetermined position, the method may include controlling, with the computing device, an operation of the first braking device or the second braking device such that the braking force is applied to the corresponding wheel in a manner that adjusts the position of the implement towards the predetermined position.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
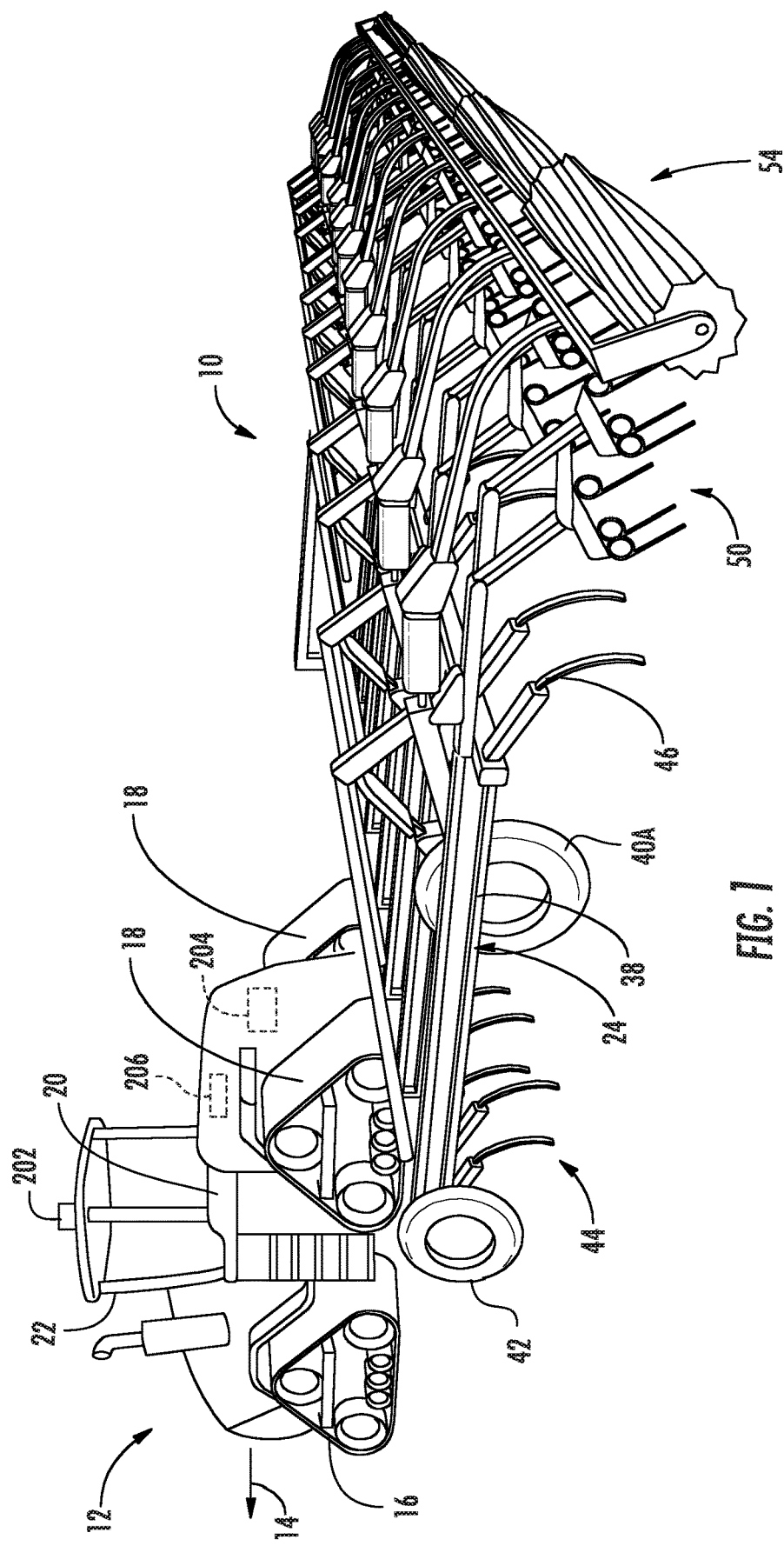
FIG. 1 illustrates a perspective view of one embodiment of an agricultural implement coupled to an agricultural vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the position of an agricultural implement being towed by an agricultural vehicle. Specifically, in several embodiments, a controller of the disclosed system may be configured to determine when the position of the agricultural implement has deviated from a predetermined or desired position defined for the implement. For example, in one embodiment, the controller may be configured to monitor the position of the agricultural implement relative to a longitudinal centerline of the agricultural vehicle in the direction of travel. In such an embodiment, when the positions of the longitudinal centerlines of the agricultural implement and vehicle differ, the controller may be configured to determine that the position of the implement has deviated from its predetermined or desired position. Thereafter, the controller may be configured to control the operation of a non-contact-based braking device, such as a hysteresis brake, of the agricultural implement such that a braking force is applied to a wheel of the implement in a manner that adjusts the position of the implement towards the predetermined or desired position in the direction of travel.

Figure 2:
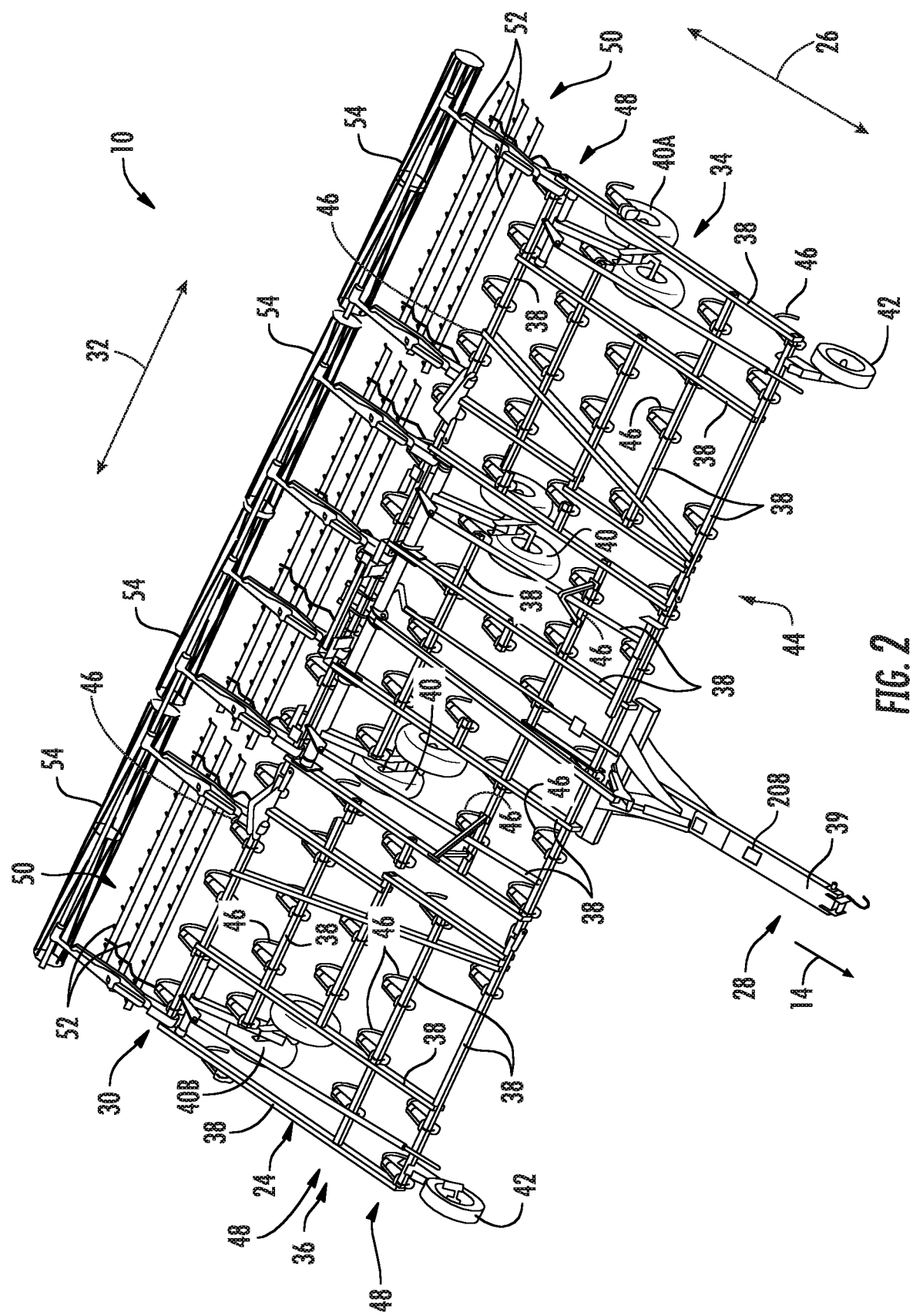
FIG. 2 illustrates a perspective view of the agricultural implement shown in FIG. 1, particularly illustrating various components of the implement in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to an agricultural vehicle 12. Additionally, FIG. 2 illustrates a perspective view of the implement 10, particularly illustrating various components of the implement 10.

In general, the agricultural vehicle 12 may be configured to tow the implement 10 across a field in a direction of travel (e.g., as indicated by arrow 14 in FIG. 1). As shown, the agricultural vehicle 12 may be configured as an agricultural tractor and the implement 10 may be configured as an associated tillage implement. However, in other embodiments, the agricultural vehicle 12 may be configured as any other suitable type of vehicle, such as an agricultural harvester, a self-propelled sprayer, and/or the like. Similarly, the implement 10 may be configured as any other suitable type of implement, such as a planter, seeder, side-dresser, strip tiller, pull-type sprayer, and/or the like.

As shown in FIG. 1, the agricultural vehicle 12 includes a pair of front track assemblies 16 (one is shown), a pair of rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the agricultural vehicle 12 and/or one or more components of the implement 10. Additionally, as is generally understood, the agricultural vehicle 12 may include an engine (not shown) and a transmission (not shown) mounted on the chassis 20. The transmission may be operably coupled to the engine and may provide variably adjusted gear ratios for transferring engine power to the track assemblies 16, 18 via a drive axle assembly (not shown) (or via axles if multiple drive axles are employed). However, it should be appreciated that, in alternative embodiments, the agricultural vehicle 12 may have any other suitable configuration. For example, in one embodiment, the agricultural vehicle 12 may include one or more wheels in place of the front and/or rear track assemblies 16, 18.

In several embodiments, a vehicle-based location sensor 202 may be provided in operative association with the agricultural vehicle 12. In this regard, the vehicle-based location sensor 202 may be configured to detect a parameter associated with the geographical or physical location of the agricultural vehicle 12 within the field. For instance, in one embodiment, the vehicle-based location sensor 202 may be configured to detect the location of a longitudinal centerline of the agricultural vehicle 12 within the field. As such, the vehicle-based location sensor 202 may correspond to a GNSS-based receiver configured to detect the GNSS coordinates of the agricultural vehicle 12. However, it should be appreciated that, in alternative embodiments, the vehicle-based location sensor 202 may be configured as any other suitable location sensing device for detecting the location of the agricultural vehicle 12. Furthermore, although the vehicle-based location sensor 202 is mounted on the cab 22 in FIG. 1, it should be appreciated the location sensor 202 may be mounted at any other suitable location on the agricultural vehicle 12.

Moreover, a speed sensor 204 may be provided in operative association with the agricultural vehicle 12. As such, the speed sensor 204 may be configured to detect a parameter associated with the speed at which the agricultural vehicle 12 is travelling across the field. For example, in one embodiment, the speed sensor 204 may be configured as a Hall Effect sensor configured to detect the rotational speed of an output shaft of the transmission of the agricultural vehicle 12. However, it should be appreciated that, in alternative embodiments, the speed sensor 204 may be configured as any other suitable device for sensing or detecting the speed of the agricultural vehicle 12.

Additionally, an angle or incline sensor 206 may be provided in operative association with the agricultural vehicle 12. As such, the angle sensor 206 may be configured to detect a parameter associated with the angle, the incline, the vertical deviation, and/or the roll of the implement 10 relative to the agricultural vehicle 12. For example, in one embodiment, the angle sensor 206 may be configured as an inclinometer. However, it should be appreciated that, in alternative embodiments, the angle sensor 206 may be configured as any other suitable device for sensing or detecting the angle of the field across which the agricultural vehicle 12 is traveling.

Still referring to FIGS. 1 and 2, the implement 10 may include a frame 24. More specifically, as shown in FIG. 2, the frame 24 may extend along a longitudinal direction 26 between a forward end 28 and an aft end 30. The frame 24 may also extend along a lateral direction 32 between a first side 34 and a second side 36. In this respect, the frame 24 generally includes a plurality of structural frame members 38, such as beams, bars, and/or the like, configured to support or couple to a plurality of components. In addition, the frame 24 may include a pull hitch 39 configured to couple to a corresponding adjustable hitch assembly (not shown) of the agricultural vehicle 12.

The implement 10 may further include a plurality of support wheels 40 coupled to the frame 24 to support the frame 24 relative to the ground and to facilitate towing the implement 10 in the direction of travel 14. For example, as shown in FIG. 2, in one embodiment, the implement 10 may include a first support wheel 40A coupled to the frame 24 adjacent to the first side 34 of the frame 24. Similarly, the implement 10 may also include a second support wheel 40B coupled to the frame 24 adjacent to the second side 36 of the frame 24. In this regard, the first and second support wheels 40A, 40B may be spaced apart along the lateral direction 32 and aligned along the longitudinal direction 26. As will be described below, the implement 10 may include a braking system 100 configured to apply a braking force to the first and second support wheels 40A, 40B. It should be appreciated that the implement 10 may include additional support wheel(s) 40 coupled to other locations on the frame 24, such as at a central location(s) of the frame 24 along the lateral direction 32. Additionally, in one embodiment, a set of front pivoting wheels 42 may be coupled to the forward end 28 of the frame 24 to facilitate towing the implement 10 in the direction of travel 14.

In several embodiments, the frame 24 may be configured to support a cultivator 44, which may be configured to till or otherwise prepare the soil over which the implement 10 travels to create a seedbed. In this respect, the cultivator 44 may include a plurality of ground engaging tools 46, which are pulled through the soil as the implement 10 moves across the field in the direction of travel 14. In one embodiment, the ground engaging tools 46 may be configured to be pivotally mounted to the frame 24 to allow the ground engaging tools 46 to pivot out of the way of rocks or other impediments in the soil. As shown, the ground engaging tools 46 may be arranged into a plurality of ranks 48, which are spaced apart from one another along the longitudinal direction 26 between the forward end 28 and the aft end 30 of the frame 24. Furthermore, within each of the ranks 48, the ground engaging tools 46 may be spaced apart from one another along the lateral direction 32 between the first side 34 and the second side 36 of the frame 24.

Moreover, as shown in FIGS. 1 and 2, the implement 10 may also include one or more harrows 50. As is generally understood, the harrows 50 may be configured to be pivotally coupled to the frame 24. The harrows 50 may include a plurality of ground engaging elements 52, such as tines or spikes, which are configured to level or otherwise flatten any windrows or ridges in the soil created by the cultivator 44. Specifically, the ground engaging elements 52 may be configured to be pulled through the soil as the implement 10 moves across the field in the direction of travel 14. It should be appreciated that the implement 10 may include any suitable number of harrows 50. In fact, some embodiments of the implement 10 may not include any harrows 50.

Moreover, in one embodiment, the implement 10 may optionally include one or more baskets or rotary firming wheels 52. As is generally understood, the baskets 54 may be configured to reduce the number of clods in the soil and/or firm the soil over which the implement 10 travels. As shown, each basket 54 may be configured to be pivotally coupled to one of the harrows 50. Alternately, the baskets 54 may be configured to be pivotally coupled to the frame 24 or any other suitable location of the implement 10. It should be appreciated that the implement 10 may include any suitable number of baskets 54. In fact, some embodiments of the implement 10 may not include any baskets 54.

Additionally, as shown in FIG. 2, an implement-based location sensor 208 may be provided in operative association with the implement 10. In this regard, the implement-based location sensor 208 may be configured to detect a parameter associated with the geographical or physical location of the implement 10 within the field. For instance, in one embodiment, the implement-based location sensor 208 may be configured to detect the location of a longitudinal centerline of the implement 10 within the field. As such, the implement-based location sensor 208 may correspond to a GNSS-based receiver configured to detect the GNSS coordinates of the implement 10. However, it should be appreciated that, in alternative embodiments, the implement-based location sensor 208 may be configured as any suitable location sensing device for detecting the location of the implement 10. Furthermore, although the implement-based location sensor 208 mounted on the hitch 39 in FIG. 2, it should be appreciated the location sensor 208 may be mounted at any other suitable location on the implement 10.

Additionally, it should be appreciated that the configuration of the agricultural implement 10 and agricultural vehicle 12 described above and shown in FIGS. 1 and 2 is provided only to place the present subject matter in an exemplary field of use. Thus, it should be appreciated that the present subject matter may be readily adaptable to any manner of implement and/or vehicle configuration.

Figure 3:
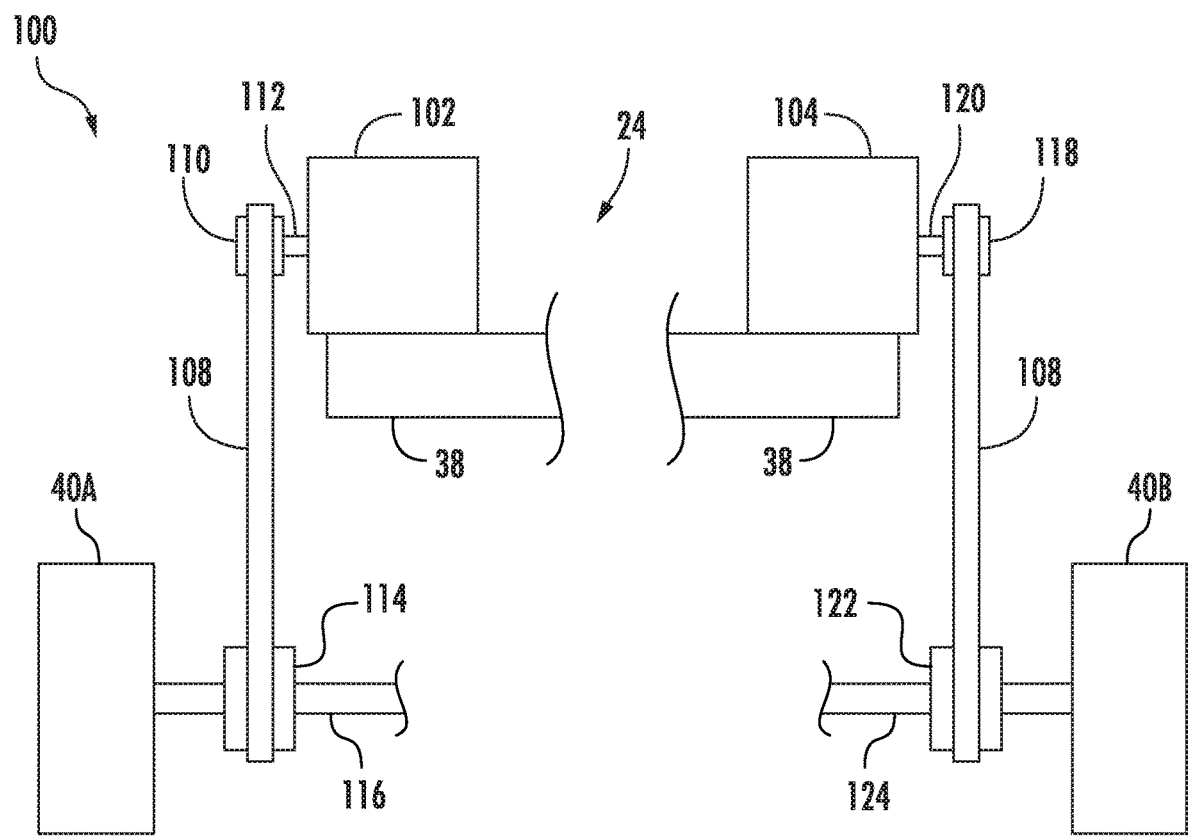
FIG. 3 illustrates a front view of one embodiment of a braking system for an agricultural implement in accordance with aspects of the present subject matter.

Referring now to FIG. 3, a front view of one embodiment of a braking system 100 is illustrated in accordance with aspects of the present subject matter. In general, the braking system 100 will be described herein with reference to the agricultural implement 10 described above with reference to FIGS. 1 and 2. However, it should be appreciated by those of ordinary skill in the art that the disclosed braking system 100 may generally be utilized with agricultural implements having any other suitable implement configuration.

As shown, the braking system 100 may include first and second non-contact-based braking devices 102, 104 provided in association with the first and second support wheels 40A, 40B, respectively. In this regard, the first braking device 102, when activated, may be configured to apply a braking force to the first support wheel 40A in a manner that reduces the wheel speed or otherwise slows the rotation of the wheel 40A. Similarly, the second braking device 104, when activated, may be configured to apply a braking force to the second support wheel 40B in a manner that reduces the wheel speed or otherwise slows the rotation of the wheel 40B. Moreover, in one embodiment, the first and second braking devices 102, 104 may be configured for independent activation. That is, each of the first and second braking devices 102, 104 may be activated without also activating the other of the first and second braking devices 102.

It should be appreciated that the first and second non-contact-based braking devices 102, 104 may correspond to any suitable non-contact-based devices for reducing the wheel speeds of the wheels 40A, 40B. For example, in one embodiment, the braking devices 102, 104 may correspond to hysteresis brakes. In general, a hysteresis brake may include a rotor or drag cup positioned within an electronic pole structure such that an air gap is defined between the rotor and the electronic pole structure. As such, the rotor may be configured to rotate relative to the electronic pole structure. When a field coil embedded within the rotor is magnetized (e.g., by applying an electric current thereto), a magnetic torque is generated within the air gap. The magnetic torque may, in turn, cause the rotor to rotate such that a braking force is created. As will be described below, non-contact-based braking devices, such as hysteresis brakes, may produce one or more advantages over the use of conventional contact-based brakes.

In several embodiments, the braking system 100 may include first and second flexible, endless members 106, 108 configured to transmit the braking forces from the first and second braking devices 102, 104 to the associated wheels 40A, 40B. Specifically, the first and second braking devices 102, 104 may be mounted on or otherwise coupled to one or more frame members 38 of the implement 10 at positions located generally above the support wheels 40A, 40B. In this regard, the first member 106 may be configured to frictionally engage a pulley 110 coupled to an output shaft 112 of the first braking device 102 and a pulley 114 coupled to an axle 116 on which the first support wheel 40A is mounted. Similarly, the second member 108 may be configured to frictionally engage a pulley 118 coupled to an output shaft 120 of the second braking device 104 and a pulley 122 coupled to an axle 124 on which the second support wheel 40B is mounted. When the first and second braking devices 102, 104 are activated, their output shafts 112, 120 may rotate in the opposite direction of the rotation of the wheels 40A, 40B or the axles 116, 124. In this regard, the members 106, 108 may be configured to transmit the rotational energy to the output shafts 112, 120 to the associated axles 116, 124. Such rotation energy may in the direction opposite of the rotation of the wheels 40A, 40B or the axles 116, 124, thereby providing a non-symmetrical braking force to the wheels 40A, 40B. Additionally, in one embodiment, the pulleys 114, 122 coupled to the axles 116, 124 may have greater diameters than the pulleys 114, 122 coupled the outputs shafts 112, 120 to increase the torque transmitted by the associated members 106, 108. It should be appreciated that the first and second flexible, endless members 106, 108 may be configured as belts (e.g., V-belts), chains, or any other suitable member for transmitting rotational energy between the braking devices 102, 104 and the wheels 40A, 40B. Furthermore, it should be appreciated that, in alternative embodiments, the first and second braking devices 102, 104 may be directly coupled to or otherwise integrated into the axles 116, 124 such that the magnetic torque generated by the braking devices 102, 104 is directly applied to associated axles 116, 124.

Figure 4:
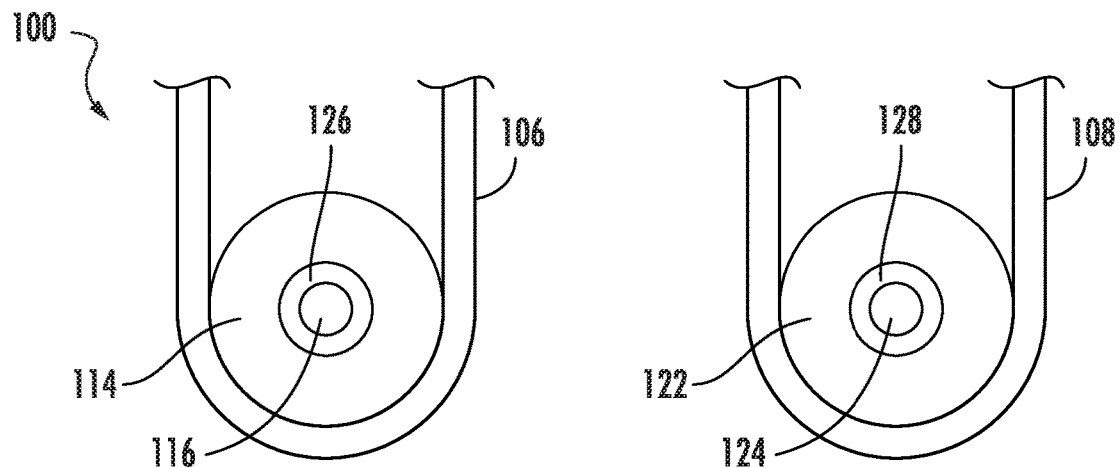
FIG. 4 illustrates a partial, side view of the braking system shown in FIG. 3, particularly illustrating a freewheel clutch coupled between an axle of an agricultural implement and a pulley mounted on the axle in accordance with aspects of the present subject matter.

Referring now to FIG. 4, the braking system 100 may include first and second freewheel clutches 126, 128. For example, as shown, in one embodiment, the first freewheel clutch 126 may be coupled between the axle 116 of the first wheel 40A and the associated pulley 114. As such, when the first braking device 102 is deactivated, the first freewheel clutch 126 may be configured to permit the first wheel 40A and the axle 116 to rotate without also rotating the first flexible member 106 and the output shaft 112 of the first braking device 102 (i.e., the first wheel 40A and the axle 116 may "freewheel"). Conversely, when the first braking device 102 is activated, the first freewheel clutch 126 may be configured to mechanically couple the axle 116 and the associated pulley 114 in a manner that transmits the braking force from the braking device 102 to the first wheel 40A. Furthermore, the second freewheel clutch 128 may be coupled between the axle 124 of the second wheel 40B and the associated pulley 122. As such, when the second braking device 104 is deactivated, the second freewheel clutch 128 may be configured to permit the second wheel 40B and the axle 124 to rotate without also rotating the second flexible member 108 and the output shaft 120 of the second braking device 104 (i.e., the second wheel 40B and the axle 124 may "freewheel"). Conversely, when the second braking device 104 is activated, the second freewheel clutch 128 may be configured to mechanically couple the axle 124 and the associated pulley 122 in a manner that transmits the braking force from the braking device 104 to the second wheel 40B. However, it should be appreciated that, in alternative embodiments, the first and second freewheel clutches 126, 128 may be coupled between the output shafts 112, 120 and the associated pulleys 110, 118, respectively. In such embodiments, the first and second freewheel clutches 126, 128 may be configured to permit the wheels 40A, 40B; the axles 116, 124; and flexible members 106, 108 to rotate without also rotating the corresponding output shafts 112, 120.

Moreover, it should be appreciated that the first and second freewheel clutches 126, 128 may be configured as any suitable devices that permit the first and second wheels 40A, 40B to "freewheel" relative to the output shafts 112, 120 of first and second braking devices 102, 104 when such braking devices 102, 104 are deactivated. For example, in one embodiment, the first and second freewheel clutches 126, 128 may be configured as Sprag clutches.

Moreover, it should be appreciated that the configuration of the braking system 100 described above and shown in FIGS. 3 and 4 is provided only to place the present subject matter in an exemplary field of use. Thus, it should be appreciated that the present subject matter may be readily adaptable to any manner of braking system configuration.

Figure 5:
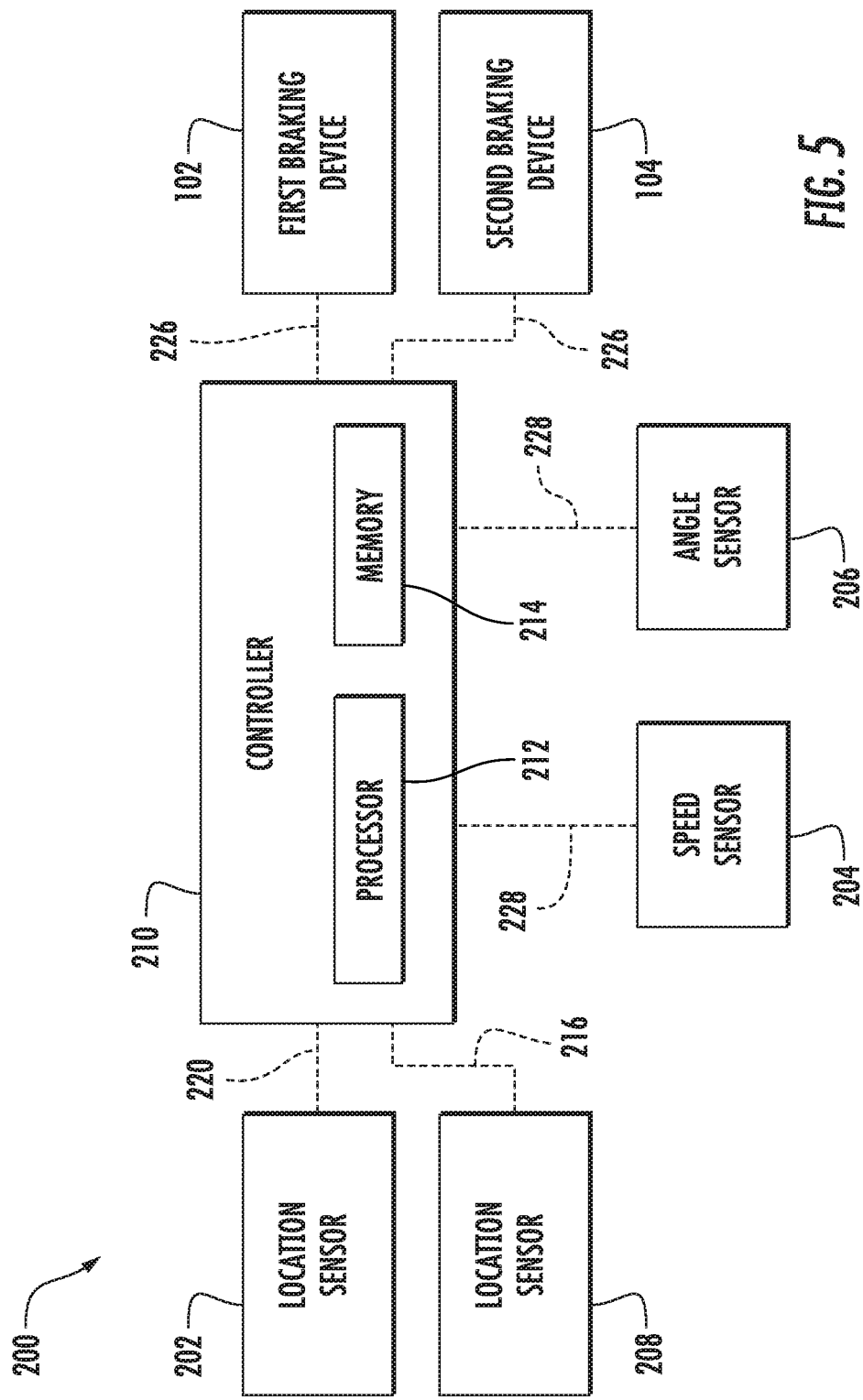
FIG. 5 illustrates a schematic view of one embodiment of a system for controlling the position of an agricultural implement being towed by an agricultural vehicle in accordance with aspects of the present subject matter.

Referring now to FIG. 5, a perspective view of one embodiment of a system 200 for controlling the position of an agricultural implement being towed by an agricultural vehicle is illustrated in accordance with aspects of the present subject matter. In general, the system 200 will be described herein with reference to the agricultural implement 10, the agricultural vehicle 12, and the braking system 100 described above with reference to FIG. 1-4. However, it should be appreciated by those of ordinary skill in the art that the disclosed system 200 may generally be utilized with agricultural implements having any other suitable implement configuration, agricultural vehicles having any other suitable vehicle configuration, and/or braking systems having any other suitable system configuration.

As shown in FIG. 5, the system 200 may include one or more components of the agricultural implement 10, the agricultural vehicle 12, and/or the braking system 100. For example, in one embodiment, the system 200 may include the first and second braking devices 102, 104. However, it should be appreciated that, in alternative embodiments, the system 200 may include any other suitable components.

In accordance with aspects of the present subject, the system 200 may include a controller 210 configured to electronically control the operation of one or more components of the implement 10, the agricultural vehicle 12, and/or the braking system 100. In general, the controller 210 may comprise any suitable processor-based device known in the art, such as a computing device or any suitable combination of computing devices. Thus, in several embodiments, the controller 210 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the controller 210 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 214 may generally be configured to store suitable computer-readable instructions that, when implemented by the processor(s) 212, configure the controller 210 to perform various computer-implemented functions, such as one or more aspects of the method 300 described below with reference to FIG. 7. In addition, the controller 210 may also include various other suitable components, such as a communications circuit or module, one or more input/output channels, a data/control bus and/or the like.

It should be appreciated that the controller 210 may correspond to an existing controller of the implement 10, the agricultural vehicle 12, or the braking system 100 or the controller 210 may correspond to a separate processing device. For instance, in one embodiment, the controller 210 may form all or part of a separate plug-in module that may be installed within the implement 10, the agricultural vehicle 12, or the braking system 100 to allow for the disclosed system and method to be implemented without requiring additional software to be uploaded onto existing control devices of the implement 10, the agricultural vehicle 12, or the braking system 100. It should also be appreciated that the functions of the controller 210 may be performed by a single processor-based device or may be distributed across any number of processor-based devices, in which instance such devices may be considered to form part of the controller 210. For instance, the functions of the controller 210 may be distributed across multiple application-specific controllers, such as a geopositional or navigation controller.

In several embodiments, the controller 210 may be configured to monitor the location of the implement 10 as the implement 10 towed across the field by the agricultural vehicle 12. Specifically, the controller 210 may be communicatively coupled to the implement-based location sensor 208 via wired or wireless connection to allow implement location data (e.g., as indicated by dashed line 216 in FIG. 5) to be transmitted from the location sensor 208 to the controller 210. Based on the received implement location data 216, the controller 210 may be configured to determine the location or geographical position of the implement 10 within the field. For example, in one embodiment, the controller 210 may be configured to monitor the location of a longitudinal centerline 218 (FIG. 6) of the implement 10 within the field.

Furthermore, the controller 210 may be configured to determine when the monitored position of the implement 10 differs from a predetermined or desired position defined for the implement 10. In several embodiments, the predetermined or desired position for the implement 10 may be a position relative to the vehicle 12. As such, the controller 210 may be communicatively coupled to the vehicle-based location sensor 202 via wired or wireless connection to allow vehicle location data (e.g., as indicated by dashed line 220 in FIG. 5) to be transmitted from the location sensor 202 to the controller 210. Based on the received vehicle location data 220, the controller 210 may be configured to determine the location or geographical position of the agricultural vehicle 12 within the field. Thereafter, the controller 210 may be configured to compare (e.g., via calculations, maps, graphs or other visual reports and/or the like) the monitored location of the implement 10 to the monitored location of the vehicle 10 to determine when the position of the implement 10 differs from its desired position.

Figure 6:
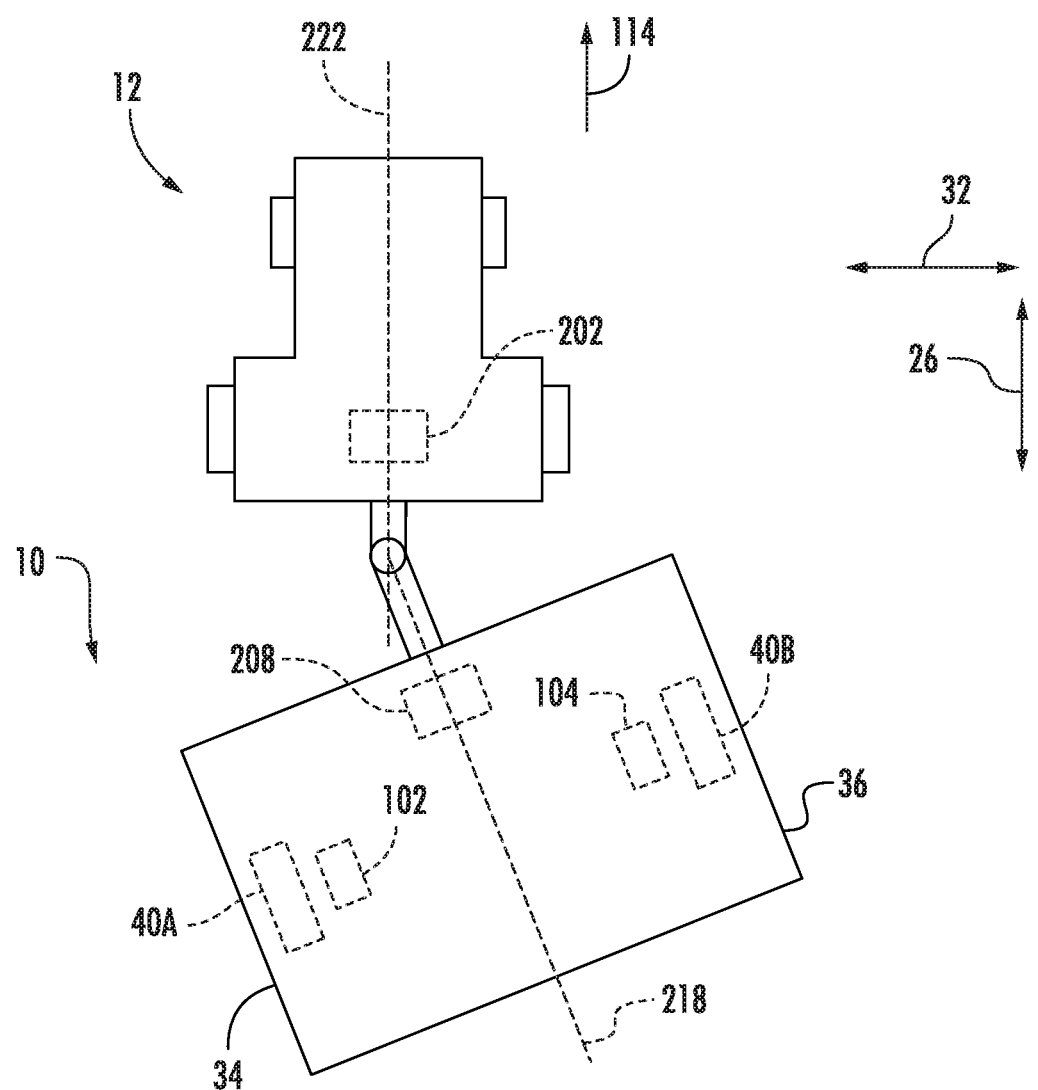
FIG. 6 illustrates a simplified, top view of one embodiment of an agricultural implement coupled to an agricultural vehicle in accordance with aspects of the present subject matter, particularly illustrating the implement positioned relative to the vehicle such that a longitudinal centerline of the implement differs from a longitudinal centerline of the vehicle.

Referring now to FIG. 6, in one embodiment, the predetermined or desired position for the implement 10 may be the position of a longitudinal centerline 222 of the agricultural vehicle 12. In such embodiment, the controller 210 may be configured to monitor the location of the longitudinal centerline 222 of the implement 10 within the field, e.g., based on the received vehicle location data 220. Thereafter, the controller 210 may be configured to compare the location of the longitudinal centerline 218 of the implement 10 to the location of the longitudinal centerline 222 of the agricultural vehicle 12. In the event that the locations of the longitudinal centerlines 218, 222 differ (e.g., an angle and/or a lateral distance is defined between the centerlines 218, 222), the controller 210 may be configured to determine that the monitored position of the implement 10 differs from the predetermined or desired position.

Furthermore, in several embodiments, the controller 210 may be configured to create a field map that identifies locations within the field at which the monitored position of the implement 10 differs from its predetermined or desired position. More specifically, as the agricultural vehicle 12 tows the implement 10 across the field, the controller 210 may be configured to record or otherwise tag the current location of the implement 10 when it is determined that the monitored position of the implement 10 differs from its predetermined or desired position. In one embodiment, the field map may visually identify the locations within the field at which the monitored position of the implement 10 differs from its predetermined or desired position. In such an embodiment, the controller 210 may be configured to display the field map to the operator of the agricultural vehicle 12, e.g., via the user interface (not shown) positioned within the cab 22. However, it should be appreciated that, in alternative embodiments, the field map may have any other suitable configuration that provides an indication of the locations within the field at which the position of the implement 10 differs from its predetermined position, such as a data table or matrix.

When it is determined that the position of the implement 10 differs from its predetermined or desired position, the controller 210 may be configured to control the operation of the first or second braking device 102, 104 such that a braking force is applied to the corresponding wheel 40A, 40B in a manner that adjusts the position of the implement 10 towards the predetermined or desired position. Specifically, as shown in FIG. 5, the controller 210 may be communicatively coupled to the first and second braking devices 102, 104 via a wired or wireless connection to allow control signals (e.g., as indicated by dashed lines 226 in FIG. 5) to be transmitted from the controller 210 to the first and second braking devices 102, 104. When the position of the implement 10 differs from its predetermined or desired position (e.g., when an angle is defined between the longitudinal centerlines 218, 222 of the implement 10 and the vehicle 12), one of the wheels 40A, 40B may generally be positioned forward of the other wheel 40A, 40B along the longitudinal direction 26 of the implement 10. In this regard, the controller 210 may be configured to transmit control signals 226 to the braking device 102, 104 associated with the forward wheel 40A, 40B instructing such braking device 102, 104 to apply a braking force to the forward wheel 40A, 40B. The braking force may, in turn, adjust the position of the implement 10 towards its predetermined or desired position.

Referring again to FIG. 6, the location of the longitudinal centerline 218 of the implement 10 differs from the position of the longitudinal centerline 222 of the agricultural vehicle 12 such that the second side 36 of the implement frame 24 is located forward of the first side 34 of the implement frame 24. In such instance, the controller 210 may be configured to transmit control signals 226 to the second braking device 104 instructing the second braking device 104 to apply a braking force to the second wheel 40B. The braking force may slow the rotation of the second wheel 40B in a manner that reduces the speed at which the second side of the implement frame 24 is moved along a direction of travel 14, thereby adjusting the location of the longitudinal centerline 218 of the implement 10 towards the longitudinal centerline 222 of the agricultural vehicle 12.

As indicated above, the use of the non-contact-based braking devices 102, 104 to apply braking forces to the first and second wheels 40A, 40B may provide one or more advantages. For example, the braking devices 102, 104 may be more responsive to deviations in implement position than conventional hydraulic, mechanical or other braking systems and, therefore, require smaller corrections. In As such, the braking devices 102, 104 may permit frequent, yet minor, activation or "feathering" of the braking devices 102, 104, thereby generating less heat than conventional braking systems. As such, the braking devices 102, 104 may be rapidly activated any time that the position of the implement 10 deviates from its predetermined or desired position (e.g., without having to fall outside of a range of positions). In this regard, the system 200 may be configured to be highly sensitive such that the position of the implement 10 is maintained as close as possible to the predetermined or desired position. In addition, the braking devices 102, 104 may be activated more quickly than conventional brakes (e.g., hydraulic brake calipers or shoes), further improving the sensitivity of a system 200.

Moreover, the controller 210 may be configured to monitor the speed at which the implement 10 is moved across the field. Specifically, as shown in FIG. 5, the controller 210 may be communicatively coupled to the speed sensor 204 via wired or wireless connection to allow measurement signals (e.g., as indicated by dashed line 228 in FIG. 5) to be transmitted from the speed sensor 204 to the controller 210. Based on the received measurement signals 228, the controller 210 may be configured to monitor the speed at which the implement 10 is being towed across the field relative to a maximum speed threshold. In the event that the monitored speed exceeds the maximum speed threshold (thereby indicating that the implement 10 is moving too fast), the controller 210 may be configured to deactivate the first and second braking devices 102, 104. After the braking devices 102, 104 have been deactivated, the controller 210 may be configured to maintain the braking devices 102, 104 in a deactivated state. Thereafter, the controller 210 may be configured to reactivate such braking devices 102, 104 when it is determined that the monitored speed falls below the maximum speed threshold.

Moreover, the controller 210 may be configured to monitor the angle of a slope of the field across which the implement 10 is towed. Specifically, as shown in FIG. 5, the controller 210 may be communicatively coupled to the angle sensor 206 via wired or wireless connection to allow measurement signals 228 to be transmitted from the angle sensor 206 to the controller 210. Based on the received measurement signals 228, the controller 210 may be configured to monitor the angle of the slope across which the implement is moved relative to a maximum angle threshold. In the event that the monitored angle exceeds the maximum angle threshold (thereby indicating that the slope is too steep), the controller 210 may be configured to deactivate the first and second braking devices 102, 104. After the braking devices 102, 104 have been deactivated, the controller 210 may be configured to maintain the braking devices 102, 104 in a deactivated state. Thereafter, the controller 210 may be configured to reactivate such braking devices 102, 104 when it is determined that the monitored angle falls below the maximum angle threshold.

Additionally, the system 200 may be used to assist in navigating or controlling the position of the implement 10 during transportation of the implement 10 on a road. Specifically, in such embodiment, the controller 210 may be configured to activate one or more non-contact-based braking devices of the system 200 such that the implement 10 follows the path of the centerline 222 of the agricultural vehicle 12. Such path may be a straight line or linear path, a curve or curvilinear path, a turn, and/or any other prescribed path. In this respect, the lateral movement of the implement 10 may be guided in a manner that avoids parked vehicles, buildings, signage, guardrails, and/or other obstacles. In such applications, the implement 10 may be in a folded position, with the wing sections of the frame 24 lifted off of the ground. As such, non-contact-based braking device(s) mounted on a center section of the frame 24 and associated with the center wheel(s) 40 may activated to provide the desired braking forces. It should be appreciated that the system 200 may be used to control the position of the implement 10 during road travel when an operator is present in the agricultural vehicle 12 or during autonomous applications.

Figure 7:
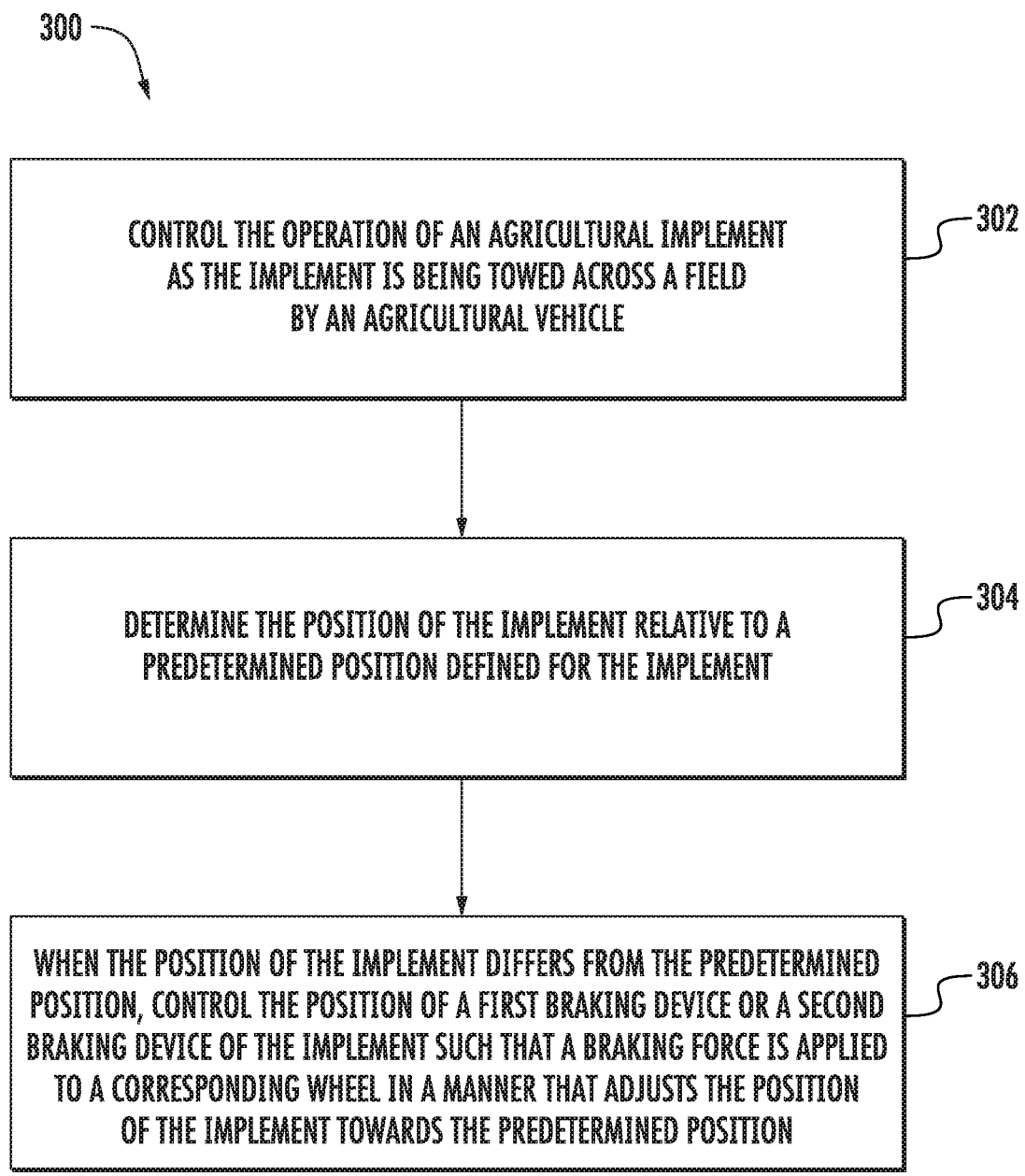
FIG. 7 illustrates a flow diagram of one embodiment of a method for controlling the position of an agricultural implement being towed by an agricultural vehicle in accordance with aspects of the present subject matter.

Referring now to FIG. 7, a flow diagram of one embodiment of a method 300 for controlling the position of an agricultural implement being towed by an agricultural vehicle is illustrated in accordance with aspects of the present subject matter. In general, the method 300 will be described herein with reference to the agricultural implement 10, the agricultural vehicle 12, the braking system 100, and the system 200 described above with reference to FIGS. 1-6. However, it should be appreciated by those of ordinary skill in the art that the disclosed method 300 may generally be utilized to control the position of any agricultural implement having any suitable implement configuration being towed by any agricultural vehicle having any suitable vehicle configuration and/or in connection with any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 may include controlling, with a computing device, the operation of an agricultural implement as the implement is being towed across a field by an agricultural vehicle. For instance, as described above, the controller 210 may be configured to control the operation of one or more components of an agricultural implement 10 as the implement 10 is being towed across a field by an agricultural vehicle 12.

Additionally, at (304), the method 300 may include determining, with the computing device, the position of the implement relative to a predetermined position defined for the implement. For instance, as described above, the controller 210 may be configured to monitor or determine the position of the implement 10, such as the position of its longitudinal centerline 218, within the field relative to a predetermined or desired position defined for the implement 10.

Moreover, as shown in FIG. 7, at (306), the method 300 may include, when the position of the implement differs from the predetermined position, controlling, with the computing device, the operation of a first braking device or a second braking device of the implement such that a braking force is applied to a corresponding wheel in a manner that adjusts the position of the implement towards the predetermined or desired position. For instance, as described above, the controller 210 may be configured to transmit control signals 226 to a first or second braking device 102, 104 instructing the braking device 102, 104 activate such that a braking force applied to the corresponding wheel 40A, 40B in a manner that adjusts the position of the implement 10 towards its predetermined or desired position.

It is to be understood that the steps of the method 300 are performed by the controller 210 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 210 described herein, such as the method 300, is implemented in software code or instructions which are tangibly stored on a tangible computer readable medium. The controller 210 loads the software code or instructions via a direct interface with the computer readable medium or via a wired and/or wireless network. Upon loading and executing such software code or instructions by the controller 210, the controller 210 may perform any of the functionality of the controller 210 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling the position of an agricultural implement being towed by an agricultural vehicle, the system comprising:
   first and second wheels;
   first and second non-contact-based braking devices, the first braking device configured to apply a braking force to the first wheel, the second braking device configured to apply a braking force to the second wheel; and
   a controller configured to control an operation of the first braking device or the second braking device when it is determined that the position of the implement differs from a predetermined position for the implement such that the braking force is applied to the corresponding wheel in a manner that adjusts the position of the implement towards the predetermined position;
   wherein the position of the implement is defined based on a location of a longitudinal centerline of the implement and the predetermined position is defined based on a location of a longitudinal centerline of the vehicle;
   first and second sensors, the first sensor configured to monitor a parameter associated with a location of the longitudinal centerline of the implement, the second sensor configured to monitor a parameter associated with a location of the longitudinal centerline of the vehicle;
   wherein first sensor comprises an implement-based location sensor configured to detect a location of the implement within a field and the second sensor comprises a vehicle-based location sensor configured to detect a location of the vehicle within the field.

2. The system of claim 1, wherein the predetermined position for the implement is a predetermined position relative to the vehicle.

3. The system of claim 1, wherein the controller is further configured to create a map that identifies locations at which the position of the implement differs from the predetermined position for the implement.

4. The system of claim 1, wherein the controller is further configured to deactivate the first and second braking devices when it is determined that at least one of a speed of the implement has exceeded a maximum speed threshold or an angle of a slope across which the implement is being moved has exceeded a maximum angle threshold.

5. The system of claim 1, further comprising:
   first and second endless flexible members, the first endless flexible member configured to transmit the braking force from the first braking device to the first wheel, the second endless flexible member configured to transmit the braking force from the second braking device to the second wheel.

6. The system of claim 5, further comprising:
   first and second freewheel clutches, the first freewheel clutch coupled between the first endless flexible member and one of an output shaft of the first braking device or an axle of the first wheel, the second freewheel clutch coupled between the second endless flexible member and one of an output shaft of the second braking device or an axle of the second wheel.

7. The system of claim 1, wherein the first and second non-contact-based braking devices comprise hysteresis brakes.

8. A method for controlling the position of an agricultural implement being towed by an agricultural vehicle, the method comprising:
   controlling, with a computing device, an operation of the implement as the implement is being towed across a field by the vehicle, the implement including a first non-contact-based braking device configured to apply a braking force to a first wheel of the implement and a second non-contact-based braking device configured to apply a braking force to a second wheel of the implement;

determining, with the computing device, a position of the implement relative to a predetermined position defined for the implement; and when the position of the implement differs from the predetermined position, controlling, with the computing device, an operation of the first braking device or the second braking device such that the braking force is applied to the corresponding wheel in a manner that adjusts the position of the implement towards the predetermined position;

monitoring, with the computing device, at least one of a speed of the implement relative to a maximum speed threshold or an angle of a slope across which the implement is being moved relative to a maximum angle threshold; and when the at least one of the monitored speed has exceeded the maximum speed threshold or the angle of the slope has exceeded the maximum angle threshold, deactivating, with the computing device, the first and second braking devices.

9. The method of claim 8, wherein the predetermined position for the implement is a predetermined position relative to the vehicle.

10. The method of claim 8, wherein the position of the implement is defined based on a location of a longitudinal centerline of the implement and the predetermined position is defined based on a location of a longitudinal centerline of the vehicle.

11. The method of claim 10, further comprising:
monitoring, with the computing device, a parameter associated with a location of the longitudinal centerline of the implement; and
monitoring, with the computing device, a parameter associated with a location of the longitudinal centerline of the vehicle.

12. The method of claim 10, further comprising:
creating, with the computing device, a map that identifies locations at which the position of the implement differs from the predetermined position for the implement.

13. The method of claim 8, wherein the implement comprises a first endless flexible member configured to transmit the braking force from the first braking device to the first wheel and a second endless flexible member configured to transmit the braking force from the second braking device to the second wheel.

14. The method of claim 13, wherein the agricultural implement comprises first and second freewheel clutches, the first freewheel clutch coupled between the first endless flexible member and one of an output shaft of the first braking device or an axle of the first wheel, the second freewheel clutch coupled between the second endless flexible member and one of an output shaft of the second braking device or an axle of the second wheel.

* * * * *